(12) United States Patent
Koren

(10) Patent No.: US 6,291,831 B1
(45) Date of Patent: Sep. 18, 2001

(54) SCANNING APPARATUS

(75) Inventor: Jacob Koren, Haifa (IL)

(73) Assignee: Orex Computer Radiography Ltd., Yokneam (IL)

(*) Notice: Subject to any disclaimer, the term of this patent is extended or adjusted under 35 U.S.C. 154(b) by 0 days.

(21) Appl. No.: 09/253,983

(22) Filed: Nov. 18, 1998

(30) Foreign Application Priority Data

Nov. 20, 1997 (IL) .................................................. 122269

(51) Int. Cl.[7] .................................................. G03B 42/00
(52) U.S. Cl. ...................... 250/584; 250/585; 250/586
(58) Field of Search ................................... 250/584, 585, 250/586, 484.4, 236; 359/201, 212, 220; 358/493

(56) References Cited

U.S. PATENT DOCUMENTS

| | | |
|---|---|---|
| 3,651,256 | 3/1972 | Sherman et al. . |
| 4,293,864 | 10/1981 | Scott . |
| 4,595,957 * | 6/1986 | Holthusen .......................... 358/290 |
| 5,047,643 * | 9/1991 | Ogura ................................. 250/584 |
| 5,508,837 | 4/1996 | Gangstead et al. . |
| 6,028,321 * | 2/2000 | Rantanen ............................ 250/584 |

* cited by examiner

Primary Examiner—Scott J. Sugarman
Assistant Examiner—Richard Hanig
(74) Attorney, Agent, or Firm—Eitan, Pearl, Latzer & Cohen-Zedek

(57) ABSTRACT

A scanning apparatus is provided, which includes a fixed, hollow cylindrical segment having a central, longitudinal axis, the interior of which forms a concave surface for intimate contact with a medium for recording and/or readout, a support structure forming a transport for translational movement along the axis, a light source mounted on the transport for movement therewith and for providing a beam capable of being directed along the axis, and a slanted mirror, angled 45 degrees with respect to the axis and mounted on the transport for translational movement therewith and for rotational spinning around the axis. The beam from the light source is reflected 90 degrees from along the axis along a radial to the medium and the rotation and translation cause the beam to scan the medium such that the rotating light beam is at all times perpendicular to the medium at the point of contact of the beam with the medium.

13 Claims, 5 Drawing Sheets

SCANNING APPARATUS

BACKGROUND OF THE INVENTION

This invention relates generally to an axially oriented optical system and more particularly to one which operates with a cylindrical member in which a medium for scanning for readout is mounted. Included are means for retrieving information from the medium. The system will be described, in part, relative to a combination of the optical system with a phosphor plate digitizing system that has phosphor plate film internally mounted in a portion or segment of a cylinder for scanning by the optical system, which includes a light beam-mirror combination operable on the central, cylindrical axis of the portion of the cylindrical phosphor plate mount, and a control system therefor.

Previously, scanners of X-ray exposed phosphor plates performed their function on a flat-bed or the external surface of a rotating drum. These systems have problems that increase the cost and reduce the quality of the X-ray image. The undesirable results obtained with a flat-bed or rotating drum system are caused by the continuous changing of the angles and distances of the light beam paths used for stimulating the phosphor of the X-ray exposed phosphor plates. Also, the collection of the stimulated light is performed with a different path and angle for each position on the phosphor plate, thereby requiring complicated, expensive compensation with a resultant reduction in quality. Additionally, the complications with attendant increases in cost are exacerbated when existing systems for supporting the phosphor plates do not maintain a fixed positioning during the scanning procedure.

An optical system for an internal drum readout apparatus, which provides for minimizing distortion together with a reduction of cost and complexity cannot be found in the art.

Neither the prior art devices nor contemplated solutions for their deficiencies are capable of resulting in a digitizer apparatus providing a combination of reduction in cost with an increase in accuracy and quality.

SUMMARY OF THE INVENTION

In view of the aforementioned drawbacks of the conventional scanner systems, it is a primary object of this invention to provide a scanning system with a novel on-axis optical system to minimize distortion and avoid complex compensation introduced by currently used arrangements, while at the same time achieving cost reduction.

Another object of this invention is to provide an optical system utilizable as a readout system.

Still another object of this invention is to provide a light beam scanning system for digitizing X-ray exposed phosphor plates for storage and/or image display.

It is another object of this invention to provide an axial phosphor plate digitizer whereby an on-axis light beam is utilized for scanning.

It is still another object of this invention to provide an on-axis light beam scanning system whereby the item to be scanned is shaped to the form of at least a part of a cylinder around the axis of the light beam.

It is a further object of this invention to provide an on-axis light beam scanning system where the object to be scanned is formed to the shape of a portion of a cylinder with an on-axis mirror rotatable about the axis.

It is still another object of this invention to provide an on-axis light beam scanning system with the object to be scanned conforming to the shape of a segment or portion of a cylinder with an on-axis, tilted mirror rotatable about the axis, whereby the beam's impingement on the scanned object is always a fixed distance from the mirror center.

Another object of this invention is to provide an on-axis light beam, light sensitive device and slanted, rotating mirror operating to scan a phosphor plate mounted on the interior of a portion of a cylinder to stimulate X-ray exposed phosphors to produce light for projection to the rotating mirror for reflection to a light sensitive device to produce a signal for processing and digitizing means for computer reconstruction of an image of the X-ray exposure of the phosphor plate.

There is thus provided, in accordance with a preferred embodiment of the present invention, a scanning apparatus including a fixed, hollow cylindrical segment having a central, longitudinal axis, the interior of which forms a concave surface for intimate contact with a medium for recording and/or readout; a support structure forming a transport for translational movement along the axis; a light source mounted on the transport for movement therewith and for providing a beam capable of being directed along the axis; a slanted mirror, angled 45 degrees with respect to the axis and mounted on the transport for translational movement therewith and for rotational spinning around the axis, whereby the beam from the light source is reflected 90 degrees from along the axis along a radial to the medium and the rotation and translation cause the beam to scan the medium such that the rotating light beam is at all times perpendicular to the medium at the point of contact of the beam with the medium.

Still further, in accordance with a preferred embodiment of the present invention, the scanning apparatus includes a 45 degree mirror fixedly mounted for movement with the transport for presentation of the beam to the center of the slanted mirror, when the light source is not aligned along the axis.

There is also provided, in accordance with another preferred embodiment of the present invention, a scanning apparatus including a hole in the center of the slanted mirror, a hollow shaft providing a beam path from the light source behind the slanted mirror to the hole, and a 45 degree mirror fixedly mounted in the hole for movement with the transport and rotated with the slanted mirror for presentation of the beam along a radial from the axis to the medium.

Moreover, in accordance with a preferred embodiment of the present invention, the scanning apparatus includes a light sensitive detector and a filter mounted on the transport in alignment with the axis for receiving light emanating from the medium during scanning and reflected by the slanted mirror to the filter, and for a specific wavelength through the detector for conversion to electrical signals.

Additionally, in accordance with another preferred embodiment of the present invention, the scanning apparatus includes a stepper motor for driving the transport and a motor with an encoder on the axis for rotation and speed control of the slanted mirror.

Still another object of this invention involves the production of a light beam scanner for readout including, a hollow cylindrical segment about a cylinder axis forming a concave support means for a medium to be scanned while it conforms to the inner surface of the support means; an optical system including a light source for producing an on-axis beam; reflecting means for directing the beam perpendicular to the axis toward the medium on the support means; means for rotating and translating the beam to scan the medium; and means for receiving data emanating from the medium and directing it to a light sensitive device for conversion to electric signals for digitization.

Furthermore, in accordance with a preferred embodiment of the present invention, the light source is a laser, and the medium is a phosphor plate.

Additionally, in accordance with another preferred embodiment, the means for reflecting includes a slanted mirror mounted on the axis for rotation.

Furthermore, in accordance with another preferred embodiment of the present invention, the laser is mounted to present its beam perpendicular to the axis and including a mirror in the path of the beam for directing the beam on-axis to the center of the reflecting means for reflection to the medium on a radius from the axis.

Moreover, in accordance with another preferred embodiment of the present invention, the light beam scanner includes a hollow shaft on the axis through which the light source sends its beam and the reflecting means includes a slanted, rotatable mirror, angled with respect to the axis, and having a small, 45 degree mirror mounted within a hole at the center of the slanted mirror for rotation therewith to receive the beam and reflect it 90 degrees toward the medium.

Still further, in accordance with another preferred embodiment of the present invention, there is provided a light beam scanner wherein the light source is mounted on the axis with its beam directed at the center of the reflecting means.

There is also provided in accordance with another preferred embodiment of the present invention a light beam scanner wherein the medium is a phosphor plate which emits stimulated light, corresponding to data recorded thereon, for application to the last mentioned means which includes the reflecting means and a filter which allows for passage only of the frequency of emitted light from the phosphor plate to a photomultiplier tube for the conversion to electrical signals.

There is further provided, in accordance with a preferred embodiment of the present invention, a novel, axially oriented system utilizable for scanning a medium internally mounted within a segment of a hollow cylinder about its central axis to form a support for the medium, including means for providing a scanning of the medium including a means for producing a beam for readout the beam being directed at the medium along a radial from the axis to the medium; means for scanning the medium with the beam, and for readout whereby information has been recorded on the medium to produce variations in light of a particular frequency; means for collecting and directing a beam from the medium to a light sensitive device for providing electrical signals in proportion to the light intensity without requiring compensation for variation of angular and path distances of the beams with respect to the medium and the axis.

Another object of this invention is to produce a scanner-digitizer apparatus and method therefor, that is easy and economical to produce of conventional, currently available materials that lend themselves to standard, mass production manufacturing techniques.

These and other advantages, features and objects will become more apparent from the following description taken in connection with the illustrative embodiments in the accompanying drawings.

BRIEF DESCRIPTION OF THE DRAWINGS

An axially oriented optical system in accordance with the present invention will be described infra with respect to the accompanying drawings, which are not drawn to scale, of which

DESCRIPTION OF PREFERRED EMBODIMENTS

Figure 1:
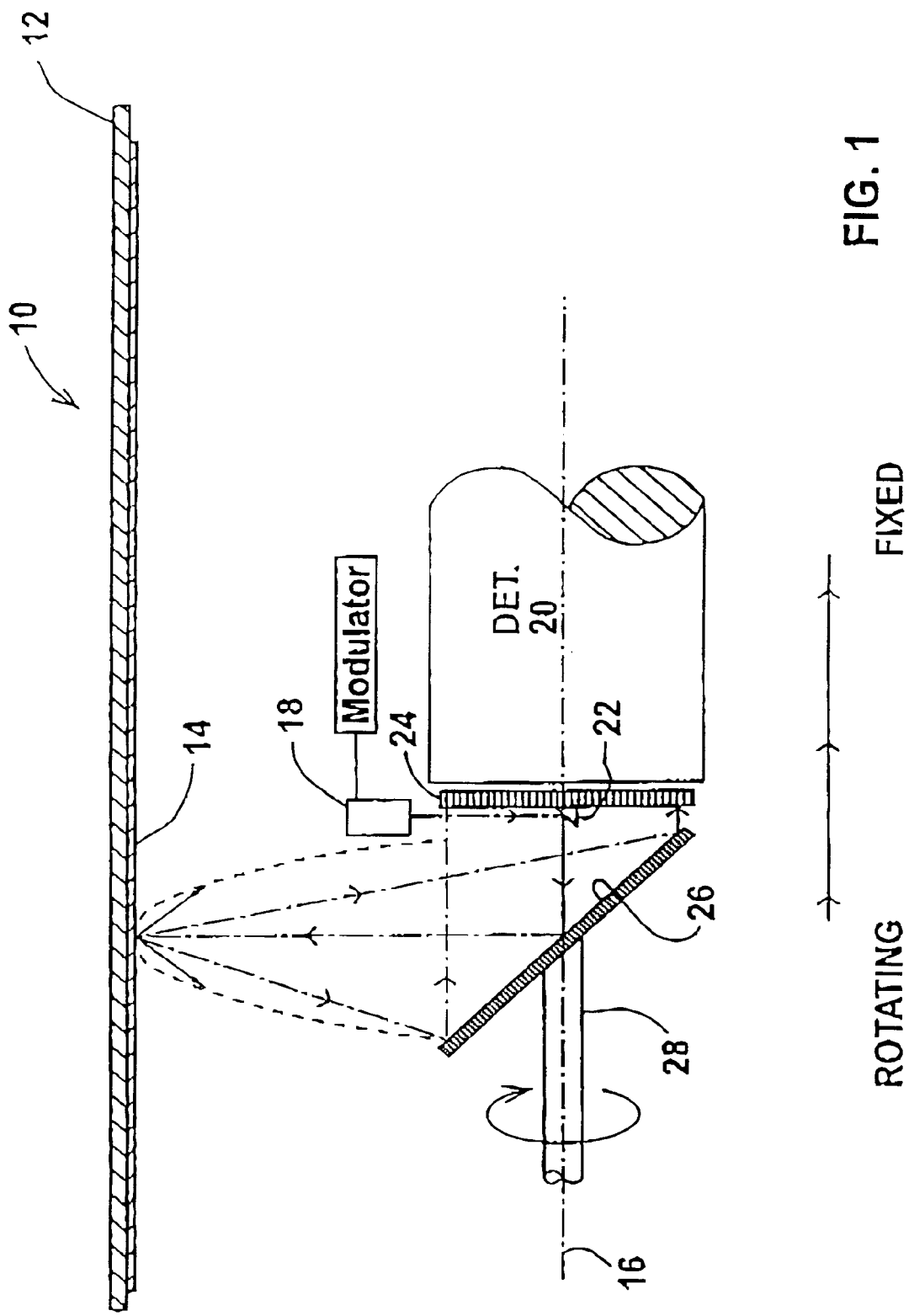
FIG. 1 is a schematic representation of one embodiment or arrangement of the optical system of this invention.

Referring to the Figures, wherein like numerals represent like parts, FIG. 1 shows a portion or segment of a hollow cylinder 12 for shaping a medium, such as a phosphor plate 14, on the internal face of the cylinder for a scanning procedure. The longitudinal, central axis 16 of the portion of the cylinder 12 forms the main axis of the entire optical system 10 to be described. Thus, when the phosphor plate 14 is located against and conforms to the internal cylindrical shape of the hollow, cylinder segment 12, the axis of the phosphor plate 14 is collinear with axis 16. As is usual with apparatus of this type, the phosphor plate is required to be enclosed to eliminate light other than that required for its function. Since the enclosure is not part of the inventive concept of this invention, it is not shown in the interest of clarity.

The optical system 10 includes a focused laser light source 18 having its peak wavelength at 635 nm in order to stimulate the phosphor plate 14 and a light sensitive detector 20, for example, a photomultiplier tube for converting the stimulated light with a peak wavelength of 390 nm emitted from the phosphor plate 14 into electric signals. The laser beam is directed, as shown by the arrowed line, at a small mirror 22 located and affixed at the center of the detector 20, for example, by gluing it to a filter 24 of the Schott type that blocks the laser beam wavelength and allows only passage of the 390 nm stimulated light emitted from the phosphor plate 14. The small mirror 22 directs the laser light source beam 90 degrees along the axis 16 of the cylinder segment 12 to the center of a rotating mirror 26, whose rotation is about the axis 16, and is angled at 45 degrees with respect to axis 16 to direct the laser beam along the radius from axis 16 to the phosphor plate 14 on the interior of cylinder 12. Of course, if small lasers were used, they could be mounted on the filter 24 in place of small mirror 22.

The light source 18, filter 24 with small mirror 22 and detector 20 remain fixed against rotation, while angled or slanted mirror 26 and its shaft 28 are rotated together. At the point of stimulation of the phosphor plate 14, the stimulated light at 390 nm is directed, as shown by the arrowed beam lines, back toward the slanted, rotating mirror 26 for passage through the filter 24 to the detector 20 for conversion to an electronic signal for digitalization, as will later be described.

The optical items 16 through 28 are to be moved in translation so that the beam from the light source traverses the fixed phosphor plate 14, for example, in the direction of the arrows below the figure while the focused beam either creates arcs of circles or, if desired, a helix during the traverse.

Figure 2:
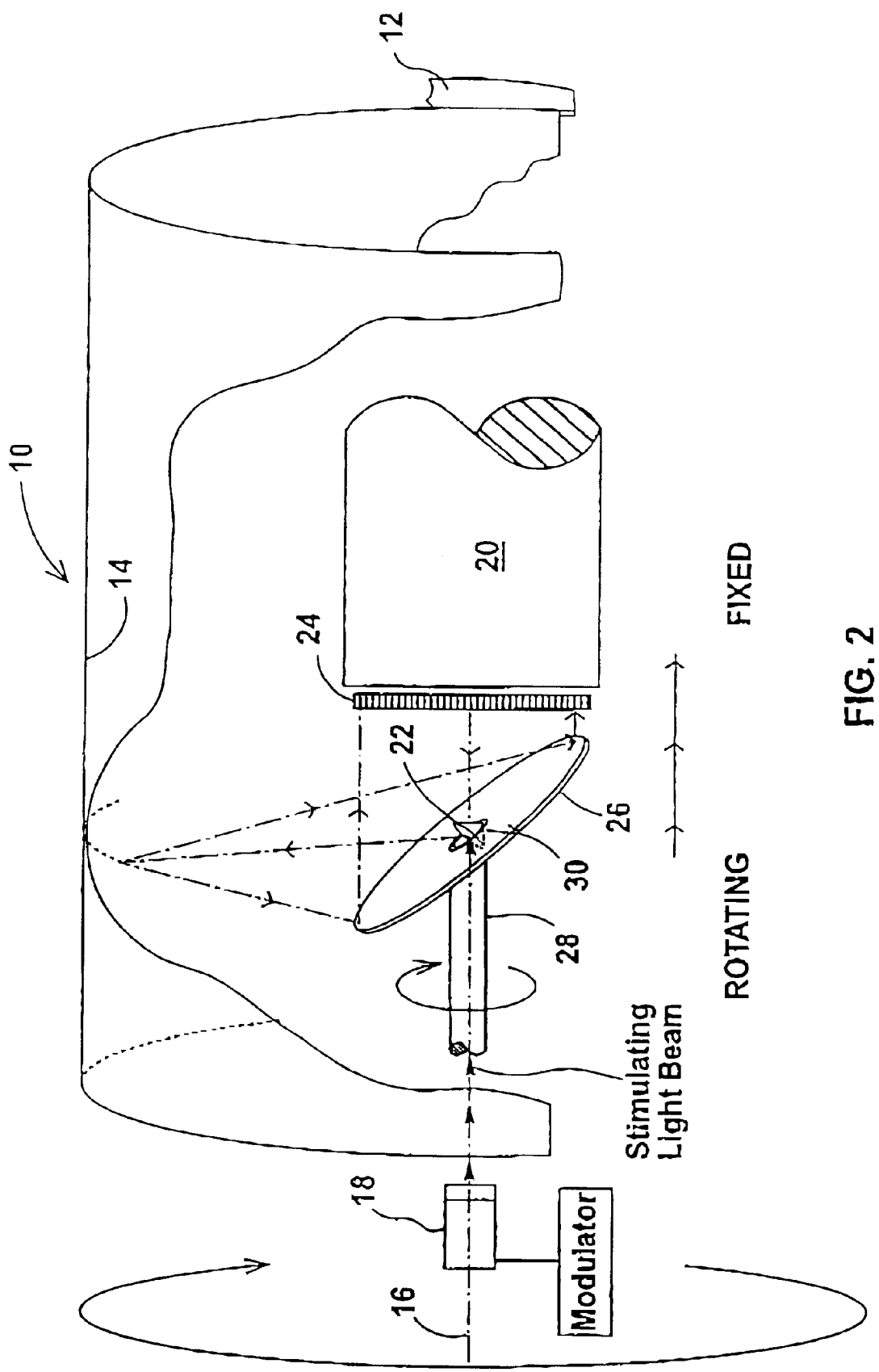
FIG. 2 is a schematic representation of an alternative arrangement of the optical system of this invention.

FIG. 2 represents schematically an alternative arrangement whereby the light source 18 lies on axis 16 of shaft 28, which is collinear with the hollow cylinder portion 12, which forms the support for phosphor plate 14. In this application the shaft is hollow for beam passage therethrough, and the angled mirror 26 has a hole 30 at its center for beam passage to small mirror 22, which is mounted within the hole. Mirror 22 need not be the exact shape as illustrated. For example, it could be a penta prism or other optic arrangement that will perform the same result as the small mirror 22.

Figure 3:
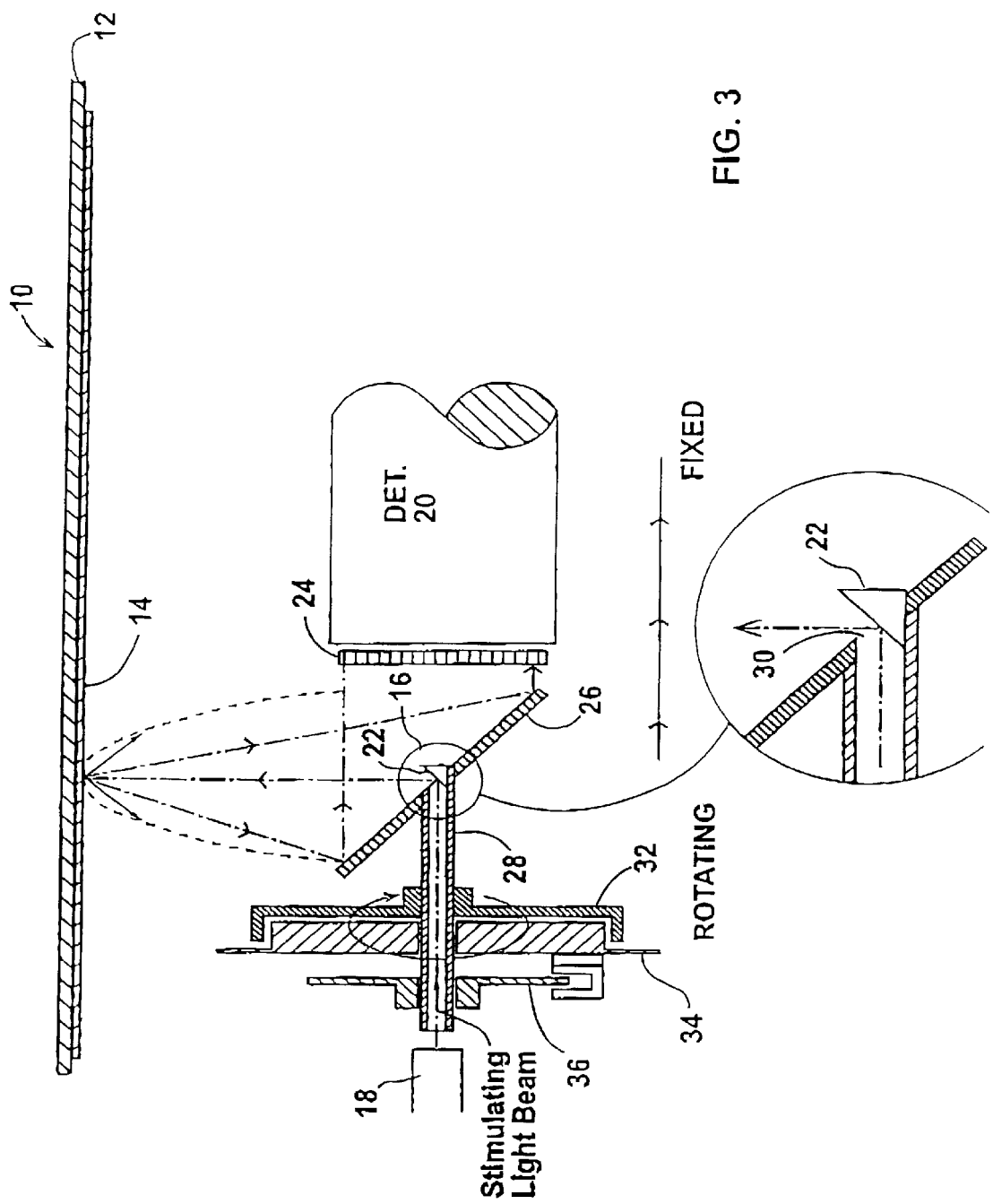
FIG. 3 is a schematic view of the embodiment of FIG. 2 with a rotative drive and encoding system that is applicable to all embodiments.

FIG. 3 illustrates the embodiment of FIG. 2 with the addition of a conventional motor mechanism comprising rotor 32, mounted for rotation with shaft 28, and a fixed stator 34. In the embodiments of FIGS. 1, 2 and 3 the filter 24 and detector 20 do not rotate. A conventional on-axis optical encoder system 36 is also mounted with respect to the motor for providing feedback pulses to stabilize rotation speed and for determining the beam positioning.

Figures 4A, 4B:
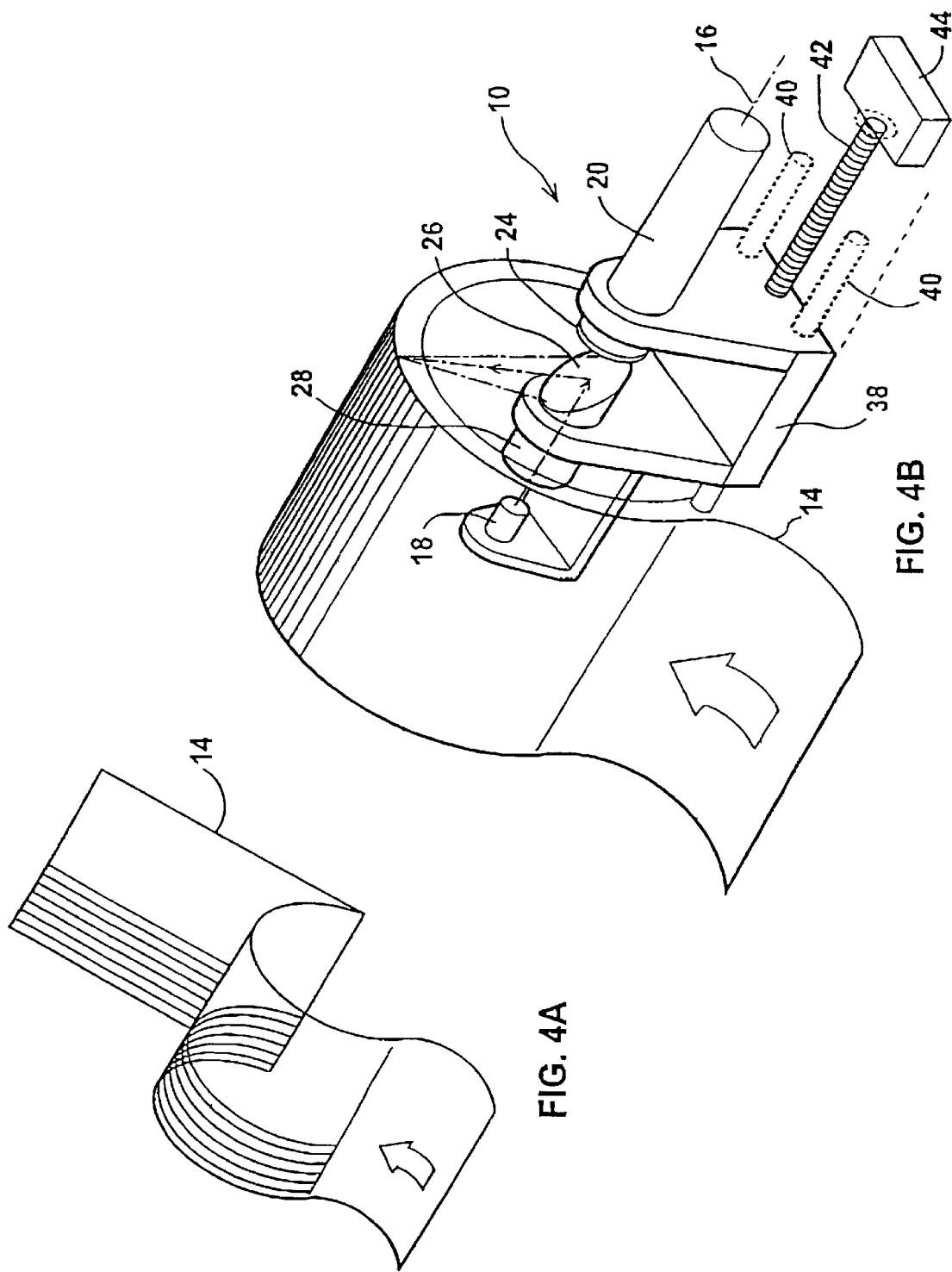
FIGS. 4A and 4B are schematic representations of a phosphor plate or film with a representation of the scan pattern thereon and a representation of a system for axial movement of the optical system, respectively.

FIGS. 4A and 4B are illustrations of a phosphor plate film 14 and the mechanism for traversing the film, respectively, during scanning whereby the rotation of the optical system 10 produces a scan path indicated by the parallel lines of FIG. 4A. FIG. 4A additionally utilizes the parallel lines for depicting a chosen distance, in this case 100 micron spacing, from the previous scan. FIG. 4B illustrates the film 14 of FIG. 4A in its position in the apparatus with the hollow, cylindrical portion 12 removed for clarity. The parallel lines of the film 14 in FIG. 4B are illustrative only of the cylindrical shape of the film 14 when it is within the cylinder 12.

Schematically illustrated in FIG. 4B is the means for effecting the axial path spacing of the optical system as disclosed in FIGS. 2 and 3. A support structure or transport 38, as seen in FIG. 4B, is provided with bearings, not shown, for those parts of the optical system 10, which are required to be rotated, as is conventional in the field of mechanical design. The means for movement of the optical system of this invention along its axis 16 can be selected from a variety of options, only one of which is illustrated. The support structure 38 has a pair of rods 40 for stabilization, guidance and maintenance of direction of the transport 38 in a straight line. A threaded member 42, fixed with respect to any axial movement, is engaged with mating threads in the support structure 38 for its axial movement in order to obtain the traversing for scanning of the focused spot with respect to the film 14. A linear stepping motor 44, schematically shown, provides the rotation of the threaded member to space accurately the separate scans across film 14. Although the light source 18 is only schematically depicted, it is shown as attached to the support structure 38.

Figure 5:
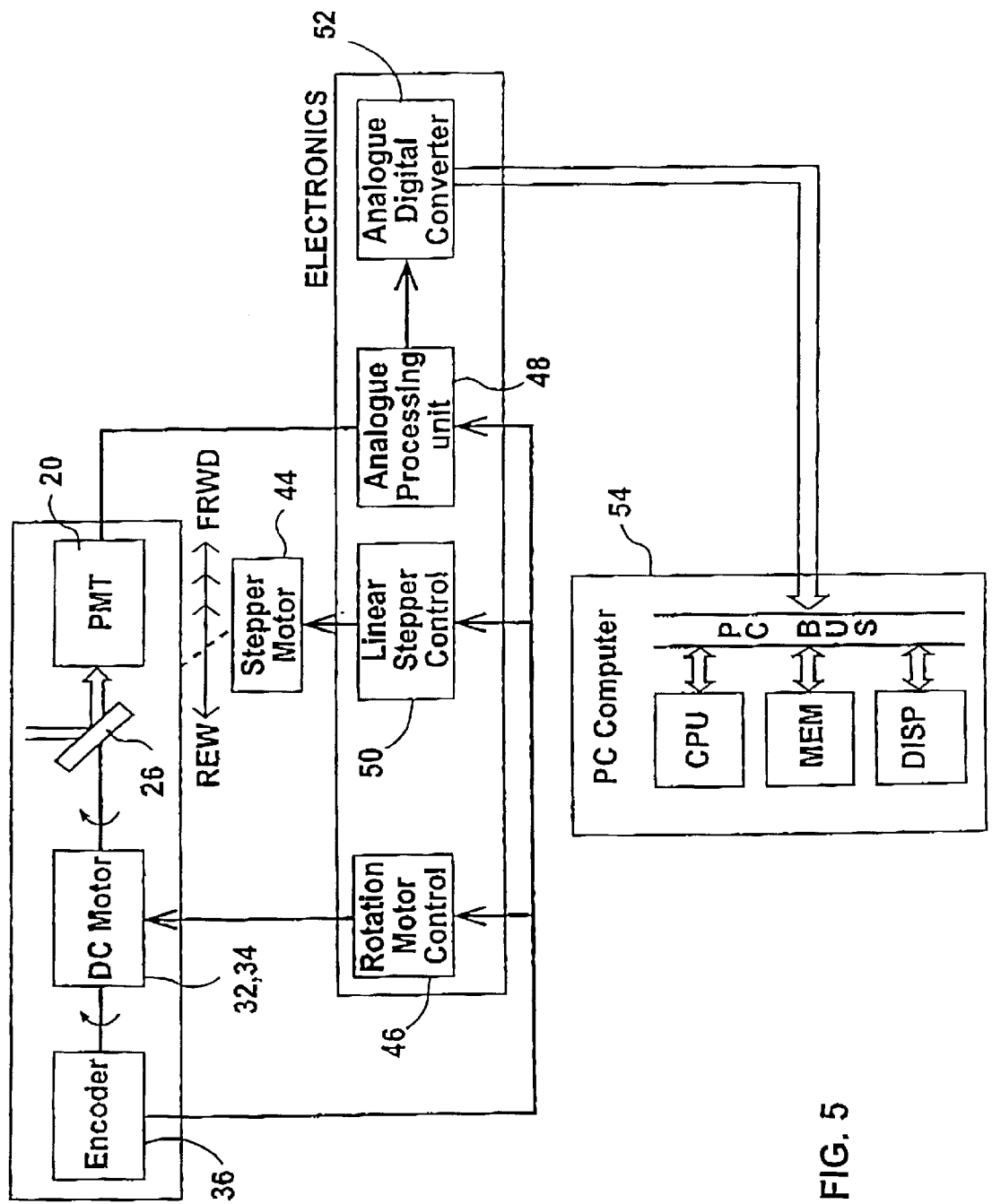
FIG. 5 is a block diagram of the control system for the operation of the optical system of this invention.

FIG. 5 is a block diagram illustrating the control of the apparatus thus far described. In the Figure the DC motor 32, 34 the encoder 36 and the 45 degree angled mirror 28 are connected for simultaneous rotary operation as shown in FIG. 3, since they all are on the same shaft 28. The DC motor has a rotation motor control 46, which in turn is connected for cooperation with encoder 36. The stepper motor 44 of FIG. 4B has a linear stepper control 50, which is also connected with the output from encoder 36. The output from the detector, photomultiplier (PMT) 20 and that of encoder 36 provide input to the analog processing unit 48, which provides its output to an analog to digital converter 52 for connection with a PC computer 64.

OPERATION

Operation of the apparatus of this invention as a readout device involves the presentation of an X-ray exposed phosphor plate or film 14 to the interior of a fixed portion of a hollow cylinder 12 to which the phosphor plate is pressed firmly to conform to the circular configuration of the cylindrical portion without any motion ensuing while the scanning or reading is being effected. Apparatus for this purpose is well known.

The scanning operation involves the mounting of a light source such as a 635 nm laser 18 and a spinning motor surface 26 that is angled at 45 degrees with respect to its axis of rotation 16, which is collinear with the central axis of the film 14 and its support 12. In order to bend the light beam 90 degrees and to rotate it with the mirror, the beam has to be reflected from the center of rotation of the mirror 26. The beam then forms a rotating spot on the film that follows a path of a portion of a circle on the phosphor plate 14. When the laser beam starts from between the rotating mirror 26 and the filter 24, no hole in the rotating mirror 26 is required. Whereas the laser 18, when it is behind the rotating mirror 26, requires a hole in its center with a small mirror 22 therein to supply the directing of the beam perpendicular to a spot on the film.

The support structure or transport 38 contains optic system 10 including light source 18, the spinning mirror 26 and small mirror 22, when required, and its movement to traverse the phosphor plate 14 is coordinated with the rotative movement of the spot such that when the spot reaches the end of the film 14, the cart then moves the distance of one pixel for the next scan. The spot is chosen to be, for example, 100 micron in diameter thereby forming a circular line 100 micron wide; therefore the transport 38 moves the optic system a distance of 100 micron for the next scan.

More specifically as a readout device, using phosphor plates, the following operation is effected.

Readout of a previously X-ray exposed phosphor plate is obtained by the 635 nm laser 18 stimulating the crystal layer of the phosphor plate causing it to radiate light at 390 nm as the beam spot on the film makes its scan. The rotating mirror 26 receive the emitted light around its outer periphery for reflection onto Schott type filter 24 which is transparent to 390 nm while absorbing 635 nm light. The light passing through filter 24 is applied to detector photomultiplier tube 20, which converts the light to an electric signal that is amplified, gated to represent one pixel on the circular scan and converted to a digital number representing the brightness of the pixel. The filter 24 and detector 20 are also mounted on the transport 38.

The encoder 36 stabilizes the motor 32,34 by feed back pulses which also control the gating of the output of the detector photomultiplier 20 to define time samples equivalent to 100 micro-meters in distance. The pulses are also used for defining, at any point in time during the scan, the angular position of rotating mirror 26 and the angle of the stimulated emission from the phosphor plate in order to activate the stepper motor for the next parallel scan. If a helical scan is required, the change would be within the skill of an ordinary technician.

Since the paths of the stimulating light and the stimulated light for all points are identical, and since the hitting and emitting angles for all scan points are perpendicular and identical, and since the scanning speed is constant and easy to maintain, there is no need for correction algorithms or compensation. Digitization resulting from the scanning action results in the ability to replicate and/or store the data from the film.

Although the invention has been illustrated in the accompanying drawings and described in the foregoing specification in terms of preferred embodiments, the invention is not limited to these embodiments. It will be apparent to those skilled in this art that certain changes, modifications and substitutions can be made without departing from the true spirit and scope of the appended claims. For example, the laser light source 18 could be mounted on the filter 24 thereby eliminating the need for small mirror 22. Furthermore, the teachings of this invention are applicable to other than a phosphor plate medium.

What is claimed is:

1. A scanning apparatus comprising:
   a fixed, hollow cylindrical segment having a central, longitudinal axis, the interior of which forms a concave surface for intimate contact with a medium for recording and/or readout;
   a support structure forming a transport for translational movement along said axis;
   a light source mounted on said transport for movement therewith and for providing a beam capable of being directed along said axis;
   a slanted mirror, angled 45 degrees with respect to said axis and mounted on said transport for translational movement therewith and for rotational spinning around said axis, said mirror configured to reflect back the stimulated light into said hollow cylindrical segment and to reflect the stimulating light.

2. An apparatus as defined in claim 1 wherein said light source is a laser.

3. An apparatus as defined in claim 1 wherein said medium is a phosphor plate and said light source is a laser.

4. An apparatus as defined in claim 1 including a 45 degree mirror fixedly mounted for movement with said transport for presentation of said beam to the center of said slanted mirror, when said light source is not aligned along said axis.

5. An apparatus as defined in claim 1 including a hole in the center of said slanted mirror, a hollow shaft providing a beam path from said light source behind said slanted mirror to said hole, and a 45 degree mirror fixedly mounted in said hole for movement with said transport and rotated with said slanted mirror for presentation of said beam along a radial from said axis to said medium.

6. An apparatus as defined in claim 1 including a light sensitive detector and a filter mounted on said transport in alignment with said axis for receiving light emanating from said medium during scanning and reflected by said slanted mirror to said filter, and for a specific wavelength through said detector for conversion to electrical signals.

7. An apparatus as defined in claim 6 including a stepper motor for driving said transport and a motor with an encoder on the said axis for rotation and speed control of said slanted mirror.

8. A light beam scanner comprising:
   a hollow cylindrical segment about a cylinder axis forming a concave support means for a medium to be scanned while it conforms to the inner surface of the support means;
   an optical system including a light source for producing an on-axis beam;
   reflecting means for directing said beam perpendicular to said axis toward the medium on said support means;
   means for rotating and translating said beam to scan said medium;
   means for receiving data emanating from said medium and directing it to a light sensitive device for conversion to electric signals for digitization; and
   a hollow shaft on said axis through which said light source sends its beam and said reflecting means comprises a slanted, rotatable mirror, angled with respect to said axis, and having a small, 45 degree mirror mounted within a hole at the center of said slanted mirror for rotation therewith to receive the beam and reflect it 90 degrees toward the medium.

9. A scanner as defined in claim 8 wherein said light source is a laser.

10. A scanner as defined in claim 8 wherein said means for reflecting comprises a slanted mirror mounted on said axis for rotation.

11. A scanner as defined in claim 8 wherein said light source is a laser and is mounted to present its beam perpendicular to said axis and including a mirror in the path of said beam for directing said beam on-axis to the center of said reflecting means for reflection to said medium on a radius from said axis.

12. A scanner as defined in claim 8 wherein the light source is mounted on said axis with its beam directed at the center of said reflecting means.

13. A device as defined in claim 8 wherein said medium is a phosphor plate which emits stimulated light, corresponding to data recorded thereon, for application to said means for receiving data which includes said reflecting means and a filter which allows for passage only of the frequency of emitted light from the phosphor plate to a photomultiplier tube for the conversion to electrical signals.

* * * * *